United States Patent
Rakshit et al.

(10) Patent No.: US 10,949,554 B2
(45) Date of Patent: Mar. 16, 2021

(54) CONTENT SECURITY FOR MIDAIR PROJECTION DISPLAY

(71) Applicant: INTERNATIONAL BUSINESS MACHINES CORPORATION, Armonk, NY (US)

(72) Inventors: Sarbajit K. Rakshit, Kolkata (IN); Mukundan Sundararajan, West of Chord Road II Stage (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

(21) Appl. No.: 16/058,493

(22) Filed: Aug. 8, 2018

(65) Prior Publication Data
US 2020/0050777 A1 Feb. 13, 2020

(51) Int. Cl.
*G06F 21/62* (2013.01)
*G03H 1/22* (2006.01)
*G03H 1/00* (2006.01)

(52) U.S. Cl.
CPC .......... *G06F 21/62* (2013.01); *G03H 1/0011* (2013.01); *G03H 1/2205* (2013.01)

(58) Field of Classification Search
CPC ................. G06F 21/62; G06F 21/6209; G06F 2221/2149; G06F 21/10; G03H 1/2205; G03H 1/0011
See application file for complete search history.

(56) References Cited

U.S. PATENT DOCUMENTS

| | | | | |
|---|---|---|---|---|
| 7,131,132 | B1* | 10/2006 | Gehlot | G07C 9/37 725/10 |
| 9,245,500 | B1* | 1/2016 | Zhang | G06F 21/84 |
| 10,656,596 | B2* | 5/2020 | Callagy | G03H 1/2294 |
| 2006/0200463 | A1* | 9/2006 | Dettinger | G06F 16/20 |
| 2007/0196030 | A1* | 8/2007 | Grimaud | G06T 17/00 382/276 |
| 2008/0174735 | A1 | 7/2008 | Quach et al. | |
| 2009/0119604 | A1* | 5/2009 | Simard | G06Q 10/10 715/757 |
| 2010/0110384 | A1 | 5/2010 | Maekawa | |
| 2012/0170089 | A1* | 7/2012 | Kim | G06F 3/04883 359/9 |

(Continued)

OTHER PUBLICATIONS

Disclosed Anonymously, "Method and system for midair projection display" IP.com No. IPCOM000250548D (Aug. 2017) pp. 1-3.

*Primary Examiner* — Michael Pyzocha
(74) *Attorney, Agent, or Firm* — Tutunjian & Bitetto, P.C.; Michael A. Petrocelli

(57) ABSTRACT

A security method that includes determining a sensitivity value for content to be projected onto a holographic surface, and determining identity for people that are within visual range of the holographic surface. The method further includes determining which of the people is authorized to view the content being projected onto the holographic surface according to the sensitivity level. The holographic surface is shaped to provide a reshaped holographic surface that obstructs people that are not authorized to view the sensitivity level of the content. The content is then projected onto the reshaped holographic surface within vision of people authorized to view the sensitivity level of the content.

18 Claims, 8 Drawing Sheets

(56) References Cited

U.S. PATENT DOCUMENTS

| | | | |
|---|---|---|---|
| 2012/0306910 A1* | 12/2012 | Kim | H04N 13/30 |
| | | | 345/619 |
| 2013/0038602 A1* | 2/2013 | Kim | H04N 13/341 |
| | | | 345/419 |
| 2013/0300637 A1 | 11/2013 | Smits et al. | |
| 2015/0244747 A1 | 8/2015 | Wickenkamp et al. | |
| 2017/0161004 A1* | 6/2017 | Lee | H04W 4/70 |
| 2017/0161049 A1* | 6/2017 | Kim | G06F 8/38 |
| 2018/0050273 A1* | 2/2018 | Garoufalis | G07F 17/3211 |
| 2018/0088527 A1* | 3/2018 | Bostick | G03H 1/2249 |
| 2018/0146343 A1* | 5/2018 | Lee | G06F 3/147 |
| 2018/0278887 A1* | 9/2018 | Bostick | H04N 7/147 |
| 2019/0080097 A1* | 3/2019 | Hardee | G06F 21/74 |
| 2019/0236376 A1* | 8/2019 | Sakashita | G07C 9/37 |
| 2019/0253269 A1* | 8/2019 | Keane | H04L 63/0254 |
| 2019/0354699 A1* | 11/2019 | Pekelny | G06F 21/35 |
| 2019/0387199 A1* | 12/2019 | Martinez-Heath | H04L 65/403 |
| 2020/0117790 A1* | 4/2020 | Wong | G06F 21/36 |

\* cited by examiner

CONTENT SECURITY FOR MIDAIR PROJECTION DISPLAY

BACKGROUND

Technical Field

The present disclosure relates to security and privacy, and in some embodiments to providing secure methods and systems for content security for midair projection displays.

Description of the Related Art

As display screens are becoming larger, brighter and sharper, they are generally easier to read from a greater distance and wider angles. Projection displays can now project contents into midair. While the trend of bigger, better, brighter, and sharper screens offers a great benefit to the user, it also presents a drawback: the content of the screen may be more visible to prying eyes in the vicinity of the user.

SUMMARY

In one aspect, the present disclosure provides a security method for projecting midair displays. In one embodiment, the method may include determining a sensitivity value for content to be projected onto a holographic surface; and determining identity for people that are within visual range of the holographic surface. The method further includes determining by computer implemented method which of the people are authorized to view the content being projected onto the holographic surface according to the sensitivity level. The method continues with shaping the holographic surface to provide a reshaped holographic surface that obstructs people that are not authorized to view the sensitivity level of the content. The content is then projected onto the reshaped holographic surface within vision of people authorized to view the sensitivity level of the content.

In another aspect, the present disclosure provides a system that securely displays content on a midair projected display. In one embodiment, the system includes a memory, and a hardware processor coupled to the memory, and a sensitivity assignment application including instructions on the memory to be executed by the hardware processor for determining a sensitivity value for the content to be projected onto a holographic surface. The system further includes a content to identity calculator for determining which of the personnel that are within visual range of the holographic surface is authorized to view the content being projected onto the holographic surface according to the sensitivity level; and an image shaping device for shaping the holographic surface to provide a reshaped holographic surface that obstructs personnel that are not authorized to view the sensitivity level of the content. The system further includes at least one projector for producing the reshaped holographic surface that obstructs personnel that are not authorized to view the sensitivity level of the content, and for projecting the content onto the reshaped holographic surface within vision of personal authorized to view the sensitivity level of the content.

In yet another aspect, a computer program product is provided for securely displaying content on a midair projected display. In one embodiment, the computer program product includes a non-transitory computer readable storage medium having computer readable program code embodied therein for performing a security method. The security method may include determining a sensitivity value for content to be projected onto a holographic surface; and determining identity for people that are within visual range of the holographic surface. The method further includes determining which of the people are authorized to view the content being projected onto the holographic surface according to the sensitivity level. The method continues with shaping the holographic surface to provide a reshaped holographic surface that obstructs people that are not authorized to view the sensitivity level of the content. The content is then projected onto the reshaped holographic surface within vision of people authorized to view the sensitivity level of the content.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1B:
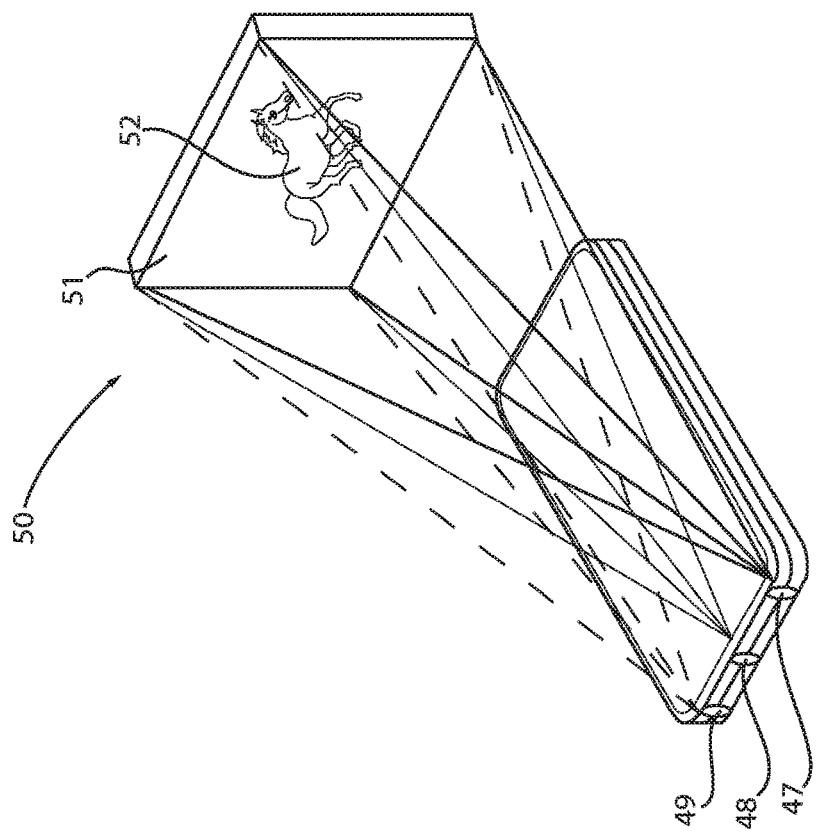
FIG. 1B is a perspective view of a projector that is projecting content onto a midair holographic surface.

Detailed embodiments of the claimed methods, systems and computer program products that are disclosed herein; however, it is to be understood that the disclosed embodiments are merely illustrative of the claimed structures and methods that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods, system and computer program products of the present disclosure.

Projection displays can be created midair. Combination of a holographic projector in combination with a projected content projection, e.g., pico projector, can provide a midair projection display. In some examples, such as a smart home, if midair contents are projected, then all people in the surrounding area can view the content. This may not be appropriate if the content is sensitive, or if the content to be displayed is only intended for one person that is within a room, when the room is filled with a plurality of people. In view of this scenario, it can be advantageous to provide systems, methods and computer program products that provide a level of security to the displayed content to ensure that the sensitive subject matter is only viewed by those that it is intended to be displayed to.

A method, system and computer program product is provided by which when a midair projection of content is to be displayed in a room including at least the intended recipient of the displayed content, a camera that is also present in the room determines the identity, as well as location of the intended user, as well as determining the identity of other people that are within the room, and whether those people should be restricted from viewing the content to be displayed. In the event that people are within visual distance of the midair projection, the methods, systems and computer program products that are described herein can reshape a holographic surface component of the midair projection to obstruct the people that are not intended receivers for the displayed content from seeing the content being displayed by the midair projection. In some embodiments, to reshape the holographic surface in order to obstruct people from viewing the content being projected onto, i.e., displayed, on the holographic surface, the thickness of the holographic surface may be increased so that it is not transparent. This provides that the displayed content that is projected onto the front side of the holographic surface cannot be viewed from the back side of the holographic surface. In some embodiments, based on the movement of the intended recipient of the information that is projected onto the holographic surface, as well as the movement of people that are not intended to receive the information that is projected onto the holographic surface, the surface profile and orientation of the holographic surface can be adjusted to maintain the security environment. In some embodiments, if the methods, systems and computer program products cannot provide a secure environment for midair projection, the midair projection can be cancelled, and the content can be sent directly to the intended recipient via a mobile electronic device. The methods, systems and computer program products of the present disclosure are now described with greater detail with reference to FIGS. 1A-8.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1A:
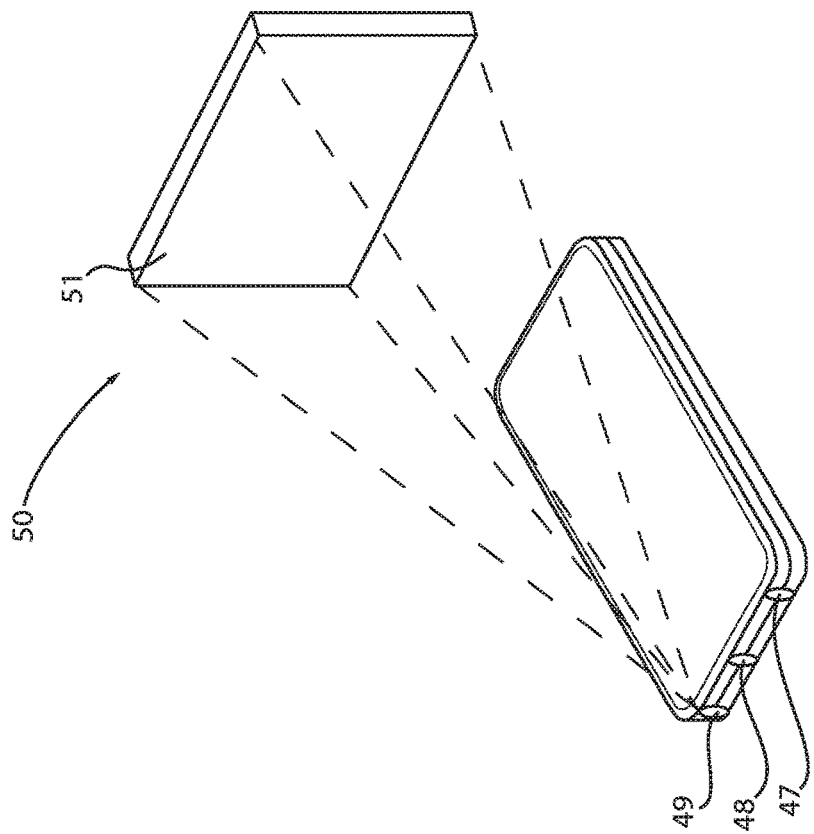
FIG. 1A is a perspective view of a holographic projector providing a midair holographic surface.

Referring to FIGS. 1A and 1B, the security methods that are described herein are for use with midair projections 50. The term "midair projection" denotes a display of content without using a physical screen. As will be described throughout the present disclosure, the midair projection may me holographic three dimensional objects that are created in mid-air. Various shapes of holographic objects can be created in midair using holographic projectors installed in a display device. To display any type of content, a display surface is needed.

Referring to FIG. 1A, for midair projection 50, the display surface is a holographic surface 51 created by a holographic projector 49. Holographic projectors 49 typically employ filters to reduce brightness and increase the image density of the projected holographic object that can provide the holographic surface 51. As per creation, the thickness of the holographic surface 51 will be less than the surface of the holographic surface 51. As illustrated in FIG. 1A, in some embodiments, the holographic surface 51 may be a holographic block that is created in midair. The holographic surface 51 may be referred to as a holographic wall.

FIG. 1B is a perspective view of a projector that is projecting content 52 onto a midair holographic surface 51. The midair projection includes both the projected content 52 and the midair holographic surface 51. In the embodiments that are depicted in FIGS. 1A and 1B, both the projector 49 for producing the holographic surface 51 and the projector 47 for projecting content 52 may be provided by the same device, however this is an optional aspect, and it is not intended that the present disclosure be limited to only this example. In other examples, multiple projectors that are provided by separate devices can be used to provide the midair projection.

Referring to FIG. 1B, in some embodiments, a camera 48 that can be installed within the same device that contains the projector 49 for producing the holographic surface, and the projector 47 for projecting content 52, can measure the surface dimension, shape, relative position and orientation of the holographic object, i.e, holographic surface 51. From that information, a computing system can calculate the dimension of the projected content, i.e., holographic surface 51, in the focus plane of the projector 47 for projecting content 52. The contents to be projected by the projector 47, e.g., pico projector, can be aligned according to the dimension of the focus plane. The camera 48 can also measure the orientation of the holographic surface, accordingly a computing system can calculate the angular alignment for the projector 47 for projecting content 52 on the holographic surface 51. As noted above, the camera can also measure the distance of the holographic surface 51, accordingly the focus plane can be calculated in the projected content.

FIG. 1B further illustrates that one of more projectors 47, e.g., pico projectors, project digital content 52 onto the holographic surface 51. Similar to the holographic surface 51, the projected digital content 53 is projected midair. The projected digital content 53 can be one or more images, one or more video, text, icons for graphic user interfaces, e.g., mobile applications, as well as other media or communications content. Accordingly, from the midair projection, the intended recipient of the digital content can watch video, images and menu options.

Figure 2:
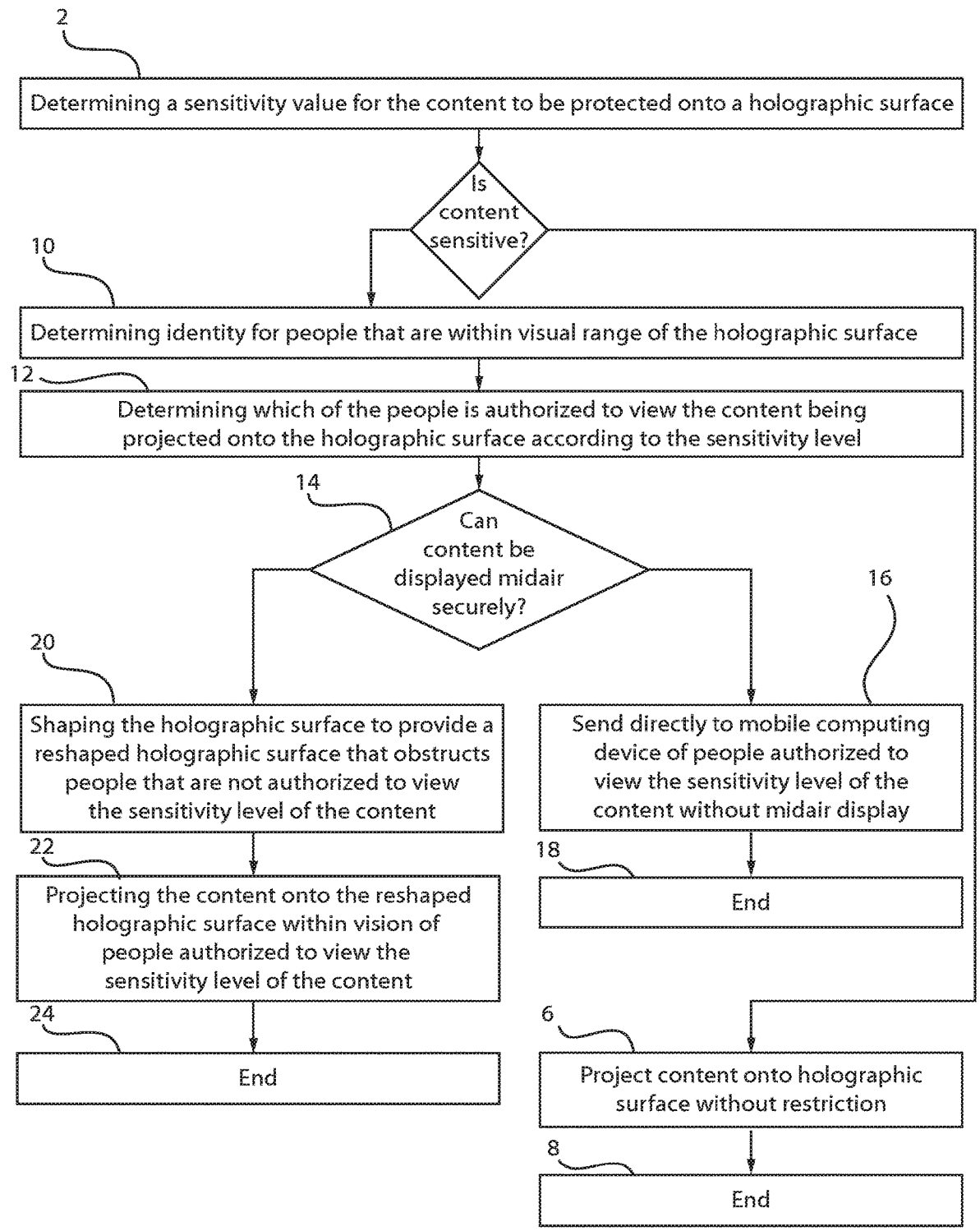
FIG. 2 is a block/flow diagram illustrating one embodiment of a security method for use with midair projections that reshapes holographic surfaces to obstruct displayed content on the holographic surface from being viewed by people that are not intended to see the displayed content, in accordance with the present disclosure.

FIG. 2 is a block/flow diagram illustrating one embodiment of a security method for use with midair projections that reshapes holographic surfaces to obstruct displayed content on the holographic surface from being viewed by people that are not intended to see the displayed content. The method that is described with reference to FIG. 2 can be incorporated within a smart house environment. A smart house environment can have various holographic projectors, cameras, and projectors for projecting digital content, e.g., pico projectors. In one example, the projector 49 that is described with reference to FIG. 1A for forming the holographic surface 51 can be separated from the camera 48 and the projector 47 for the digital content 52, and the projectors 47, 49 and the camera 48 can be mounted to different surfaces of the smart room, e.g., walls and/or ceiling surfaces of the smart room. In another example, the projectors 47, 49 and camera 48 are integrated into the same assembly as depicted in FIGS. 1A-1B, in which the assembly is mounted to a surface of the smart room, e.g., walls, floor and/or ceiling of the smart room. In accordance with the methods, systems and computer program, the individual projectors 47, 49 and camera 48, or the assembly of projectors 47, 49 and camera 48, is mounted using a rotatable and/or pivoting fixture, which may be motorized. As will be described with further detail below, the rotatable and/or pivoting fixture by which the projectors 47, 49 and camera 48 are mounted to the smart room, which is motorized, can provide that the midair projection be moved and manipulated to ensure that only the people within the smart room can view the digital content being displayed on the holographic surface.

In the some embodiments, the security method for use with midair projections that reshapes holographic surfaces to obstruct displayed content on the holographic surface from being viewed by unauthorized people can begin with determining a sensitivity value for the content to be projected on the holographic surface at block 2. IN some embodiments, the sensitivity value for the content is assigned after the sensitivity for the digital content 52 is examined using image analysis, text analysis, and active learning. In other embodiments a sensitivity level for the digital content 52 corresponds with an indication supplied by an author of the content, an indication supplied by a party that viewed the content prior to say determining the sensitivity value, tags to the digital content 52 signaling sensitivity and combinations thereof.

Figure 4:
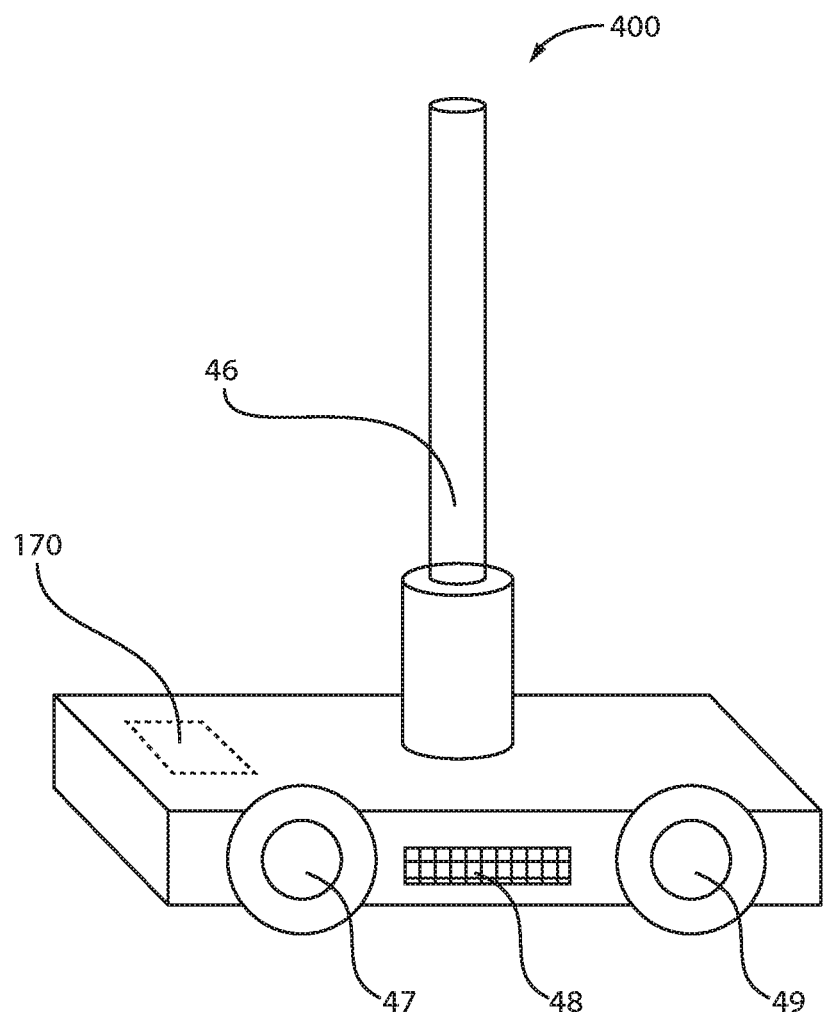
FIG. 4 is a perspective view of a projection device for forming a midair projection including a security device for use with midair projections that reshapes holographic surfaces to obstruct displayed content on the holographic surface from being viewed by people that are not intended to see the displayed content, in accordance with one embodiment of the present disclosure.
Figure 5:
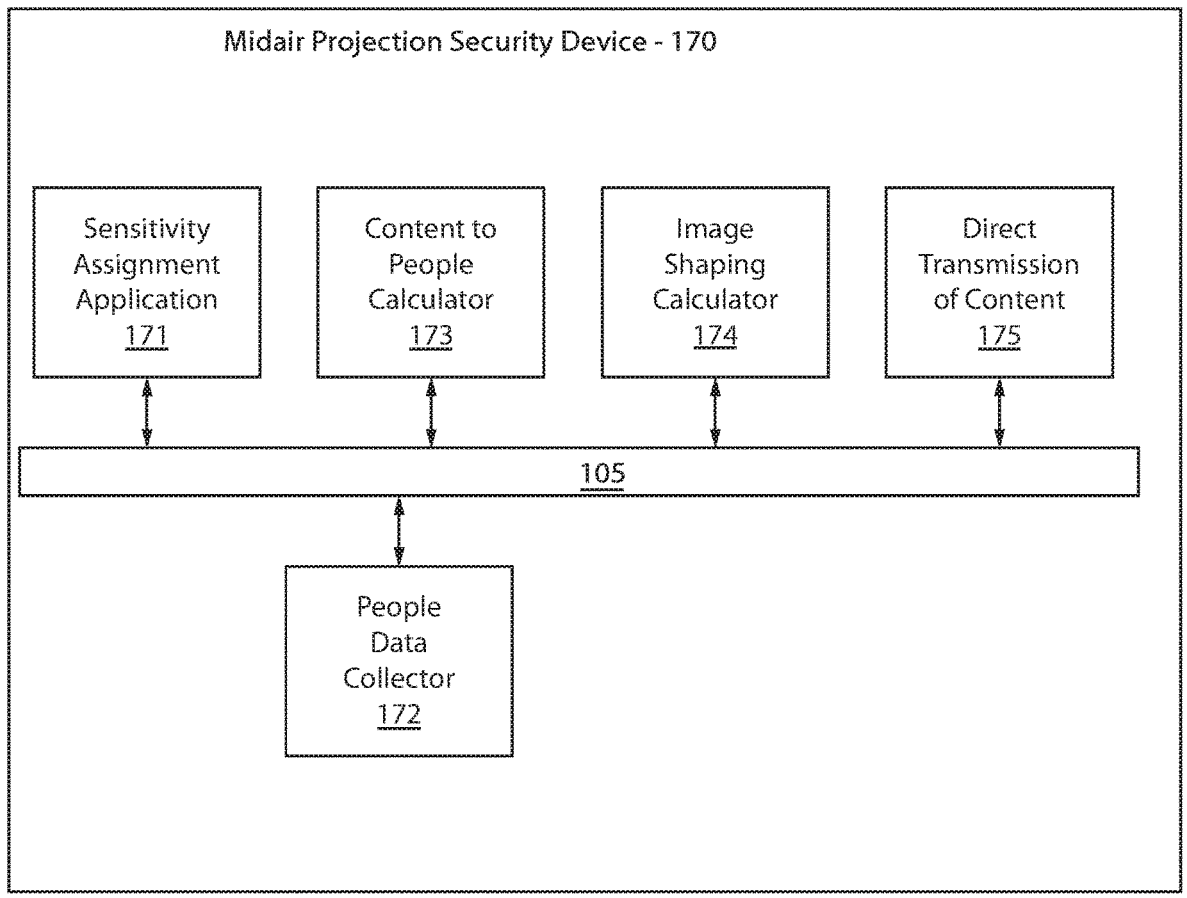
FIG. 5 is a block diagram of a midair projection security device that reshapes holographic surfaces to obstruct displayed content on the holographic surface from being viewed by people that are not intended to see the displayed content, in accordance with one embodiment of the present disclosure.
Figure 6:
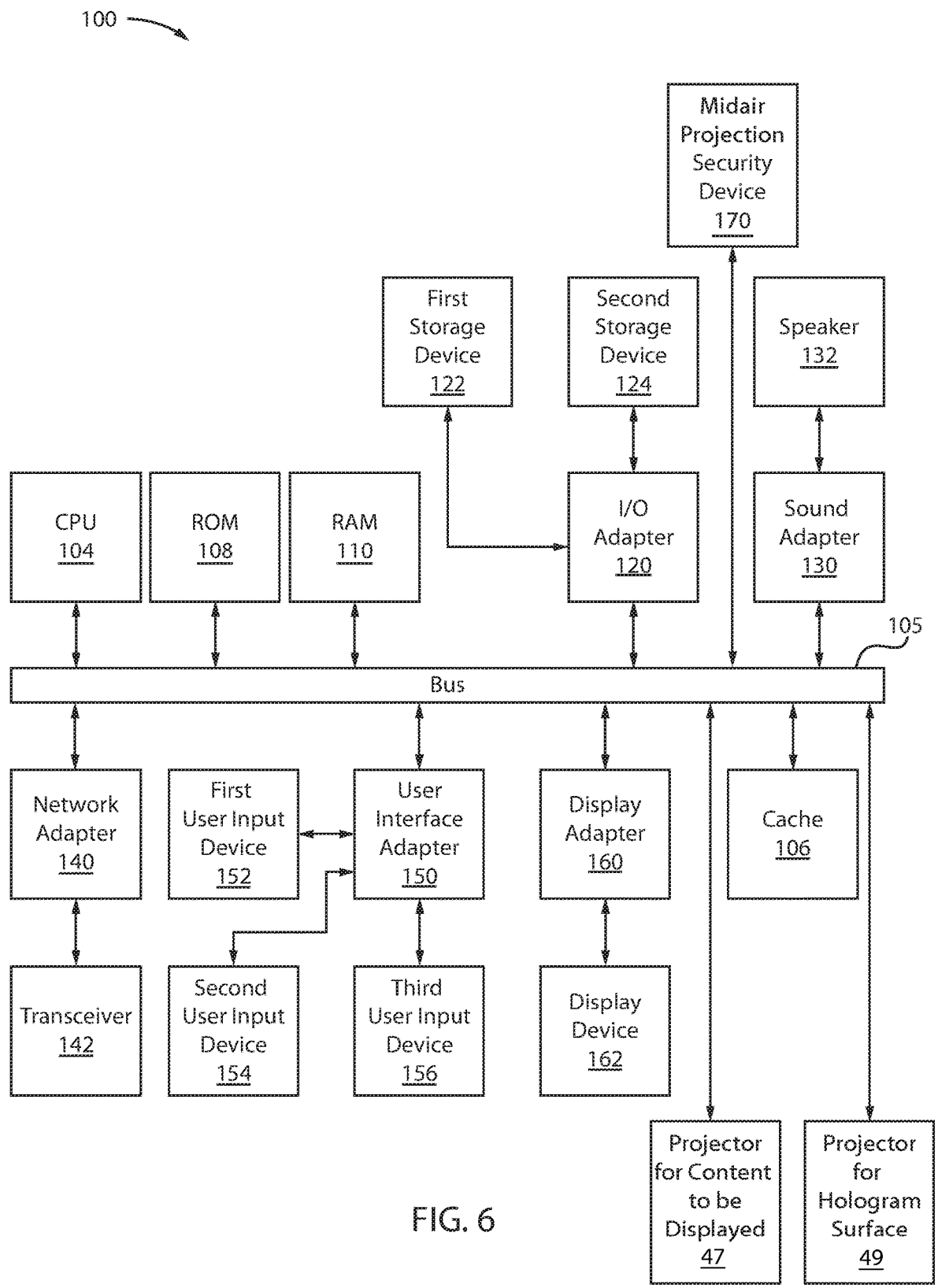
FIG. 6 is a block diagram of a system for use with midair projections that reshapes holographic surfaces to obstruct displayed content on the holographic surface from being viewed by people that are not intended to see the displayed content, in accordance with one embodiment of the present disclosure.

Referring to FIGS. 4-6, a midair projection security system 170 may be integrated with the projectors 47, 49 and the camera that provides the midair projection security system 170. The midair projection security system 170 may include a sensitivity assignment application 171. In one embodiment, digital content 52 to be projected by the projector 47 that onto the holographic surface 51 that is provided by the holographic projector 49 may be designated as being sensitive if it is only intended to be received by a limited number of qualified people, such as one person.

The digital content 52 analyzed by the sensitivity assignment application 171 of the midair projection security device 170 may be video, text and/or images. In some embodiments, the video, text and/or images that provide the digital content 52 may be transmitted for projection from the projector 47 for digital content by one of a media player, electronic mail (email), real time electronic chats (e.g., instant messenger (AOL instant messenger/MSN instant messenger/blackberry messenger (BBM), and texts (e.g., texts sent and receive using cell phones/smart phones). The sensitivity value assigned to the digital content 52 being analyzed by the sensitivity assignment application 171 may be based on image analysis, video analysis, text analysis of a communication, tags attached to the images, video and/or text, and/or an indication supplied by a sender of the digital content 52 that it contains sensitive information, e.g., confidential and/or proprietary information.

In some embodiments, text analysis as applied by the sensitivity assignment application 171 to determine whether the digital content 52 includes sensitive material, e.g., confidential and/or proprietary information, involves information retrieval, lexical analysis to study word frequency distributions, pattern recognition, tagging/annotation, information extraction, data mining techniques including link and association analysis, visualization, and predictive analytics. For example, analysis of a digital content by the sensitivity assignment application 171 may include searching for images, keywords, determining frequency of keywords, and sequences of keywords, in which the presence of the keywords can identify whether the digital content 52 is highly sensitive. In some embodiments, the sensitivity assignment application 171 determines the sensitivity of a communication by analyzing the presence of tags in the digital content 52. A tag can be a keyword, e.g., non-hierarchical keyword, or term assigned to a piece of information. For example, and email communication can be tagged as being confidential or proprietary, which would indicate that the document is highly sensitive. Tags can be a form of metadata that can help describe the sensitivity of digital content 52 being projected on the hologram surface 51. Tags are generally chosen by the digital content's creator/author. For example, the users can tag different areas of text that are more sensitive or not. In the given context, type of content, URL, and the device where content of the digital content 52 to be analyzed is rendered, etc., may all be forms of information that can be tagged into a digital content 52. Depending on the message provided by the tag, the digital content 52, which can be a communication, can be sensitive or not sensitive.

In some embodiments, social networks can be further used through active learning to improve the evaluation of sensitivity and computation of the sensitivity level of the digital content 52 by the sensitivity assignment application 171. The proposal may be to use the social network analysis by the system to allow the system to interact with one or more users as a point of contact into a deeper social network where more accurate information may lie.

In some embodiments, the decision that a digital content 52 is sensitive may be trigged by the actions of an unintended viewer to intercept the communication, e.g., by attempting to take a screen capture. Sensors incorporated into the device (or system) for receiving the digital content 52 may detect the presence of the unintended viewer attempting to intercept the digital content 52, which in turn can send a signal to the sensitivity assignment application 171 to designate the digital content 52 as being sensitive.

Still referring to FIGS. 2 and 4-6, the sensitivity assignment application 171 may assign a sensitive level to the communication that is being analyzed, and then compare the sensitivity level to a threshold sensitivity level. For example, the sensitivity assignment application 171 may assign a level of A or level B to video, text or images that are not considered to be sensitive, while the sensitivity assignment application 171 may assign a level of C to video, text or images that are considered to be sensitive. The determination of level C value of sensitivity may be based on whether the digital content 52 includes terms, i.e., keywords, that have been designated as indicative of confidential and/or proprietary information, or whether the author of the digital content has tagged the digital content 52 as being confidential and/or proprietary.

Referring to block 2 of FIG. 2, if the digital content 52 is not sensitive, the projector 47 for the digital content 52 may project the digital content 52 without restriction onto the holographic surface 51 at block 6. In some embodiments, projecting the digital content 52 without restriction means that the holographic surface 51 that the digital content 52 is projected to is transparent, and may be of a board geometry, having a thin thickness. When the digital content 52 is not sensitive, the holographic surface 51 is not reshaped to obstruct vision of the digital content 52 by any of the people that is present within the room. In this process flow, following publication of the digital content 52, the security method may end at block 8.

Referring to FIG. 2, if the digital content 52 is sensitive at block 4, the method may continue to block 10, which includes determining the identity for personnel that are within visual range of the holographic surface 51. Referring to FIGS. 4-6, in some embodiments, the midair projection security device 170 may include a person data collector 172, which includes at least one module of memory for containing personnel identity data for at least one of the people that are within the smart room.

This step of the process flow embodied in block 10 may help to determine whether there are people that the digital content 52 is not to be transmitted to. As noted above, a camera 48 is present in the system, which may be incorporated into a smart room. The camera 48 may be used to identify all of the people that is within visual distance of the holographic surface 51. In some embodiments, the camera 48 may be used in combination with facial recognition to identify all people within visual range of the holographic surface 51. In yet other examples, GPS may be used to identify people within the smart room that are present within visual view of the holographic surface 51. GPS signals may be sent to the people data collector 172 of the midair projection security device 170.

Referring to block 12 of FIG. 2, the method can continue with determining which of the people that are present within visual distance of the holographic surface 41 are authorized to view the content being projected onto the holographic surface according to the sensitivity level that is assigned to the digital display content 52. More specifically, at block 12 the sensitivity value that has been determined for the digital display content that was determined at block 2 is compared to the identities of all the people that are within visual range of the holograph surface that was determined at block 12. This function may be performed by the content to people calculator 173 of the midair projection security device 170. For example, if the sensitivity of the digital content 51 is tagged for view by a specific user, as determined at block 2, the content to people calculator 173 can determine from the people data collector 172 who is within visual distance of the midair projection, which includes the holographic surface 51 and the digital content 52 being projected onto the holographic surface 51, and whether any of the people that are within visual range of the midair projection has an identity matching the tag, as well as determine any of the people that are within visual range of the midair projection that do not have an identity matching the tag.

In another example, if the sensitivity of the digital content is assigned a value by the sensitivity assignment application determined by image analysis, video analysis, and/or text analysis of a communication, and the people within the visual range of the midair projection have preset sensitivity access values, the content to people calculator 173 can determine from the people data collector 172 who is within visual distance of the midair projection having the appropriate sensitivity value that matches the sensitivity value of the content, and whether any of the people that are within visual range of the midair projection has sensitivity value that is not sufficient to designate approved access to the digital content 52.

The content to people calculator 173 also can track the number of people within the smart room, and their locations, as well as the potential locations for projecting the midair projection.

At block 14 of FIG. 2, the method can continue with determining whether the sensitivity of the digital content 52, the identity of the people, whether the people have the appropriate clearances to view the digital content, and the number of people can allow for a secure display of a midair projection. This calculation can be performed by the content to people calculator 173 of the midair projection security device 170. In some situations, which can include a plurality of people within visual distance of the digital content 52 being projected that are not intended to view the digital content, a secure display can not feasible. For example, if numerous people are positioned around the people that the digital content is to be delivered to it may not be possible to manipulate the image to obstruct all of those people from seeing the image. For example, if people that are not authorized to view the digital content 52 have the same line of site as the people for which the digital content 52 is to be displayed for, it can be difficult to both obstruct the unintended viewers while providing an image to be viewed by the intended audience.

If the midair projection cannot be displayed securely, the method continues with sending the digital content to a mobile computing device of the people that are authorized to view the sensitivity level of the content without the midair display at step 16. The content may be distributed by the midair projection security device 170 using the direct transmission of content device 175, which can include a transreceiver for transmitting the digital content to the mobile computing device of the appropriate people.

The mobile computing device may be a tablet or phablet computer; a personal digital assistant (PDA); a portable media player (PMP); a cellular handset; a handheld gaming device; a gaming platform; a wearable or otherwise body-borne computing device, such as a smartwatch, smart glasses, or smart headgear; and/or a combination of any one or more thereof.

Communication between the mobile computing device and the midair projection security device 170 can be through a wireless connection, such as WiFi, Bluetooth, internet based connections, cellular connections and combinations thereof. Following receipt of the digital data 52 by mobile computing device and viewing by the intended recipient, the method may end at block 18.

Referring back to block 14 of FIG. 2, if the midair projection can be displayed securely, the method can continue to block 20 of FIG. 2 with shaping the holographic surface 51 to provide a reshaped holographic surface 51 that obstructs people that are not authorized to view the sensitivity level of the content, e.g., digital content 52 being projected onto the holographic surface 51 in midair. In some embodiments, an image shaping calculator 174 of the midair projection security device 170 can change the surface profile and orientation of the holographic surface 51 display content to the people that are intended to receive the content, and to obstruct people that are not intended to receive the content, i.e., digital content 52, that is being displayed on the holographic surface 51.

Figure 3B:
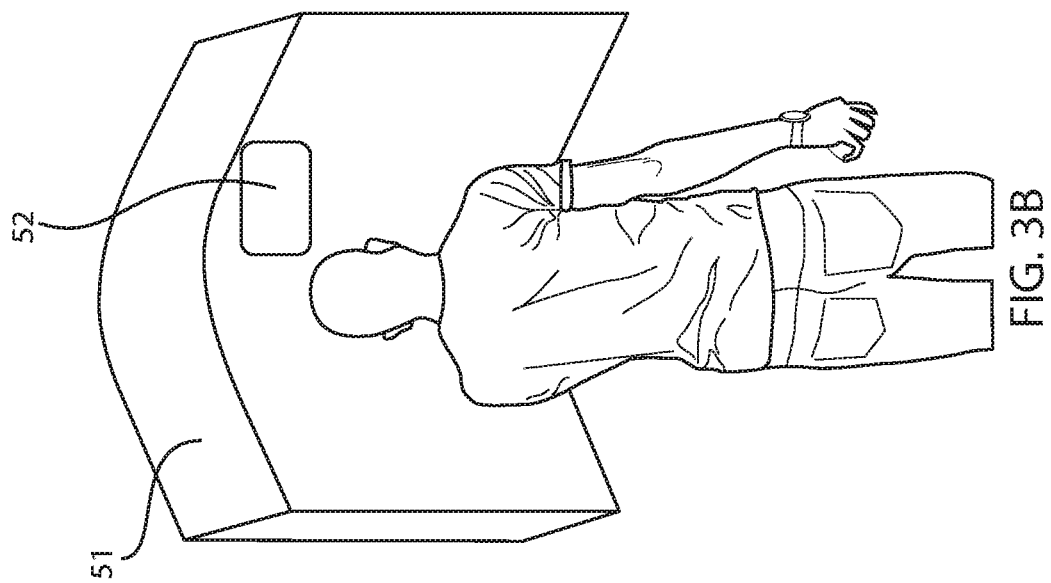
FIG. 3B is a perspective view of a reshaping the holographic surface to obstruct personnel that are not authorized to view the sensitivity level of the content that is to be projected onto the holographic surface, while the holographic surface remains orientated towards the user that is authorized to view the sensitivity level of the content, in accordance with one embodiment of the present disclosure.
Figure 3A:
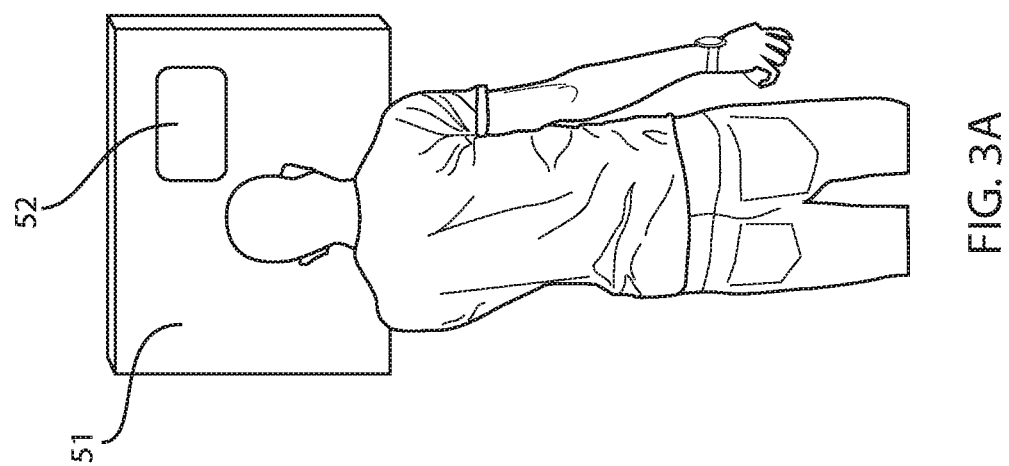
FIG. 3A is a perspective view of a holographic surface being orientated towards a user that is authorized to view the sensitivity level of the content, in accordance with one embodiment of the present disclosure.

FIGS. 3A and 3B depict one embodiment of displaying a holographic surface 51 prior to be reshaped (as depicted in FIG. 3A); and reshaping the holographic surface 51 for the purpose of obstructing unintended recipients from viewing the digital content 52 being projected onto the holographic surface 51 (as depicted in FIG. 3B).

FIG. 3A is a perspective view of a holographic surface 51 being orientated towards a user that is authorized to view the sensitivity level of the digital content. In this example, the holographic surface 51 is generally flat and thin. In this configuration, the holographic surface 51 is generally transparent. Therefore, display content 52 that is projected onto the face of the holographic surface 51 that is facing the user is visible not only to the intended recipient, but is also visible to people that are positioned on the opposing side, which could be people not intended and/or authorized to view the digital content being projected onto the holographic surface.

FIG. 3B is a perspective view of a reshaping the holographic surface 51 to obstruct people that are not authorized to view the sensitivity level of the content that is to be projected onto the holographic surface 51, while the holographic surface 51 remains orientated towards the user that is authorized to view the sensitivity level of the content. In some embodiments, shaping the holographic surface 51 to provide the reshaped holographic surface 51 includes increasing a thickness of the holographic surface to not be transparent to the people that are not authorized to view the sensitivity level of the content. In this example, the display content 52 that is projected onto the face of the holographic surface 51 that is facing the user is visible to the intended recipient, but the content is not visible to people that are positioned on the opposing side of the holographic surface 51. In this example the thickness of the holographic surface 51 provides that the holographic surface 51 is no longer transparent.

The thickness of the holographic surface 51 may be increased to levels that ensure that the holographic surface 51 is not transparent by the image shaping calculator 174 of the midair projection security device 170. The image shaping calculator 174 can modify the focus plane and/or dimensions of the projected image produced by the holographic projector 49 to provide that the holographic surface 51 is not transparent.

FIG. 3B also illustrates that in some embodiments, shaping the holographic surface 51 to provide the reshaped holographic surface 51 includes producing a curvature to the holographic surface to partially enclose the people authorized to view the sensitivity level of the digital content 52 to be projected onto the holographic surface 51. By shaping the holographic surface 51 to have a curvature at the ends of the holographic surface that wrap around the people that is intended to view the digital content 52, the reshaped holographic surface 51 obstructs people from looking around the edge of the reshaped holographic surface 51 to view the displayed content.

The shape of the holographic surface 51 may be reshaped by the image shaping calculator 174 of the midair projection security device 170 to introduce curvatures that ensure that unintended people can not view the digital content being displayed on the holographic surface 51 merely by trying to look around an edge of the holographic surface. To provide curvatures, the image shaping calculator 174 can modify the focus plane and/or dimensions of the projected image produced by the holographic projector 49 to provide that the holographic surface 51 is not planar/flat, but instead includes view obstructing curvatures.

As noted above, the projectors 47, 49 and camera 48 of the assembly that provides the midair projection may be rotatably and/or pivotably mounted to a surface of the room in which the midair projection is being displayed, and the mount for the projectors 47, 49 and camera 48 may be motorized. This provides that the midair projection including the holographic surface 51 and the digital content 52 being displayed on the holographic surface 51 can be moved. Therefore, the midair projection can be moved from regions in which people that are not authorized to see the sensitive content being display, and can be moved to regions where only people that are authorized to view the sensitive content can see the midair projection.

The above methods for moving and reshaping the midair projection may be employed in any combination to provide for a secure display to the intended recipients of the information being transmitted by the midair projection.

Referring to FIG. 2, the method may continue at block 22, which can include projecting the content, e.g., digital content 52, onto the reshaped holographic surface 51 within vision of people authorized to view the sensitivity level of the content. The content 52 that is projected onto the reshaped holographic surface 51 can be selected from the group consisting of an image, video, icons for applications, and a combination thereof. Following receipt of the digital data 52 by midair projection and viewing by the intended recipient, the method may end at block 24.

FIG. 4 is a perspective view of a projection device 400 for forming a midair projection including a midair projection security device 170 for use with midair projections that reshapes holographic surfaces 51 to obstruct displayed content on the holographic surface 51 from being viewed by people that is not intended to see the displayed content 52. The projection device 400 that is depicted in FIG. 4 is one example, of a device that can be used with the method described with reference to FIGS. 1A-3B. In some embodiments, the projection device 400 can include a projector 49 for projecting the holographic surface 51, a camera 48, and a data projector 74, e.g., pico projector, for projecting the display content, e.g., digital content 52 onto the holographic surface 51. The projection device 400 can further include a mount 46. The mount 46 may fix the projection device 400 to a wall, floor, countertop, and/or ceiling surface of a smart room, in which the midair projection is to be displayed. The mount 46 can provided that the projection device 400 be pivoted and/or rotated. The mount 46 may also be motorized.

FIG. 5 is a block diagram of a midair projection security device 170 that reshapes holographic surfaces 51 to obstruct displayed content on the holographic surface 51 from being viewed by people that are not intended to see the displayed content 52. The midair projection security device 170 may be integrated into the projection device 400 that is depicted in FIG. 4.

The midair projection security device 170 may include at least one hardware processor and memory. The midair projection security device 170 may include a sensitivity assignment application 171 including instructions to be executed by the hardware processor for determining a sensitivity value for the content to be projected onto a holographic surface. The function of the sensitivity assignment application 171 has been described with more detail with reference to blocks 2 and 4 of FIG. 2.

The midair projection security device 170 may further include a people identifier 172 for determining identity for the personnel that are within visual range of the holographic surface 51. The people identifier 172 can integrated with the camera 48, and can include instructions on memory for employing the camera 48 in combination with facial recognition to identify people. Further details of people identifier 172 has been described with more detail with reference to block 10 of FIG. 2.

The midair projection security device 170 may further include a content to people calculator 173 that includes instructions within memory for activating a hardware process to determine which of the people that are within visual range of the holographic surface is authorized to view the content being projected onto the holographic surface according to the sensitivity level. The content people calculator 173 has been described with more detail with reference to block 12 of FIG. 2.

Still referring to FIG. 5, the midair projection security device 170 can also include an image shaping device 174 that includes instructions for controlling hardware processes to provide for shaping the holographic surface 51 to provide a reshaped holographic surface 51 that obstructs people that are not authorized to view the sensitivity level of the content. The image shaping device 174 functions in combination with the projector 49 of the holographic surface 51, and has been described further with reference to block 20 of FIG. 2.

The midair projection security device 170 may also include instruction within memory for integrating with at least one projector 49 for producing the reshaped holographic surface 51 that obstructs-people that are not authorized to view the sensitivity level of the content 52, and at least one projector 47 for projecting the content 52 onto the reshaped holographic surface 51 within vision of people authorized to view the sensitivity level of the content.

Each of the aforementioned components of the midair projection device 170 are connected by a bus 105. The bus 105 further provides that the panic control server 170, and its components, can be part of a system 100 employing the panic control server 170, as depicted in FIG. 5.

FIG. 6 is a block diagram of a system for use with midair projections that reshapes holographic surfaces to obstruct displayed content on the holographic surface from being viewed by people that are not intended to see the displayed content, in accordance with one embodiment of the present disclosure. The midair projection security device 170, as well as the holographic projector 49, the digital display projector 47, and the camera 48, can be operatively coupled to the other components of the system 100 that is depicted in FIG. 6, such as at least one processor (CPU) 104, via a system bus 105. A cache 106, a Read Only Memory (ROM) 108, a Random Access Memory (RAM) 110, an input/output (I/O) adapter 120, a sound adapter 130, a network adapter 140, a user interface adapter 150, a display 30 and a display adapter 160, are also operatively coupled to the system bus 105 of the system 100.

A first storage device 122 and a second storage device 124 are operatively coupled to system bus 105 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 105 by the sound adapter 130. A transceiver 142 is operatively coupled to system bus 105 by network adapter 140. A display 30 is operatively coupled to system bus 105 by display adapter 160.

A first user input device 152, a second user input device 154, and a third user input device 156 are operatively coupled to system bus 105 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

The method described in FIGS. 1A-3B may be embodied as a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
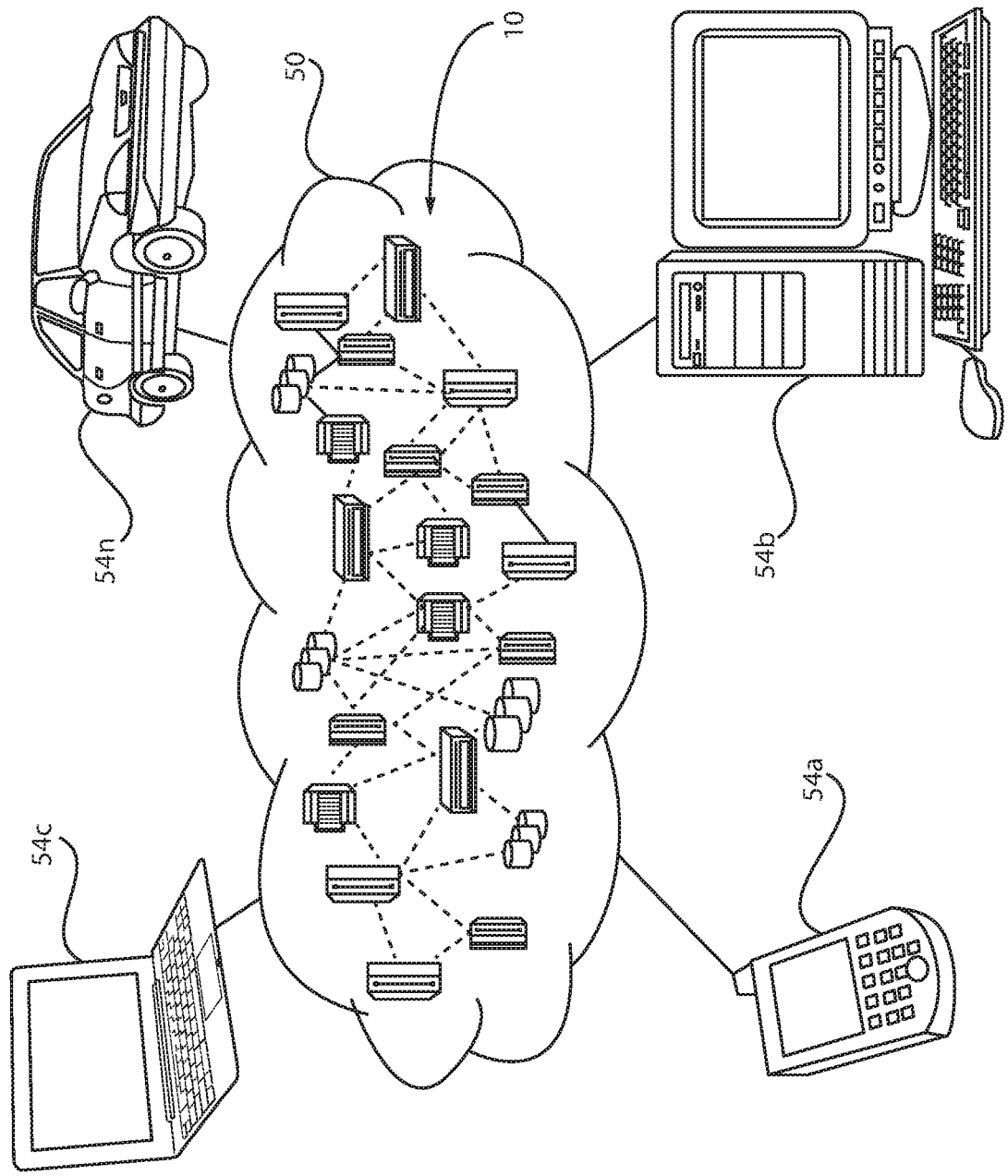
FIG. 7 depicts a cloud computing environment according to an embodiment of the present disclosure.

Referring now to FIG. 7, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 51 and cloud computing environment 50 can communicate with any type of computerized device over any type of network and/or network addressable connection (e.g., using a web browser).

Figure 8:
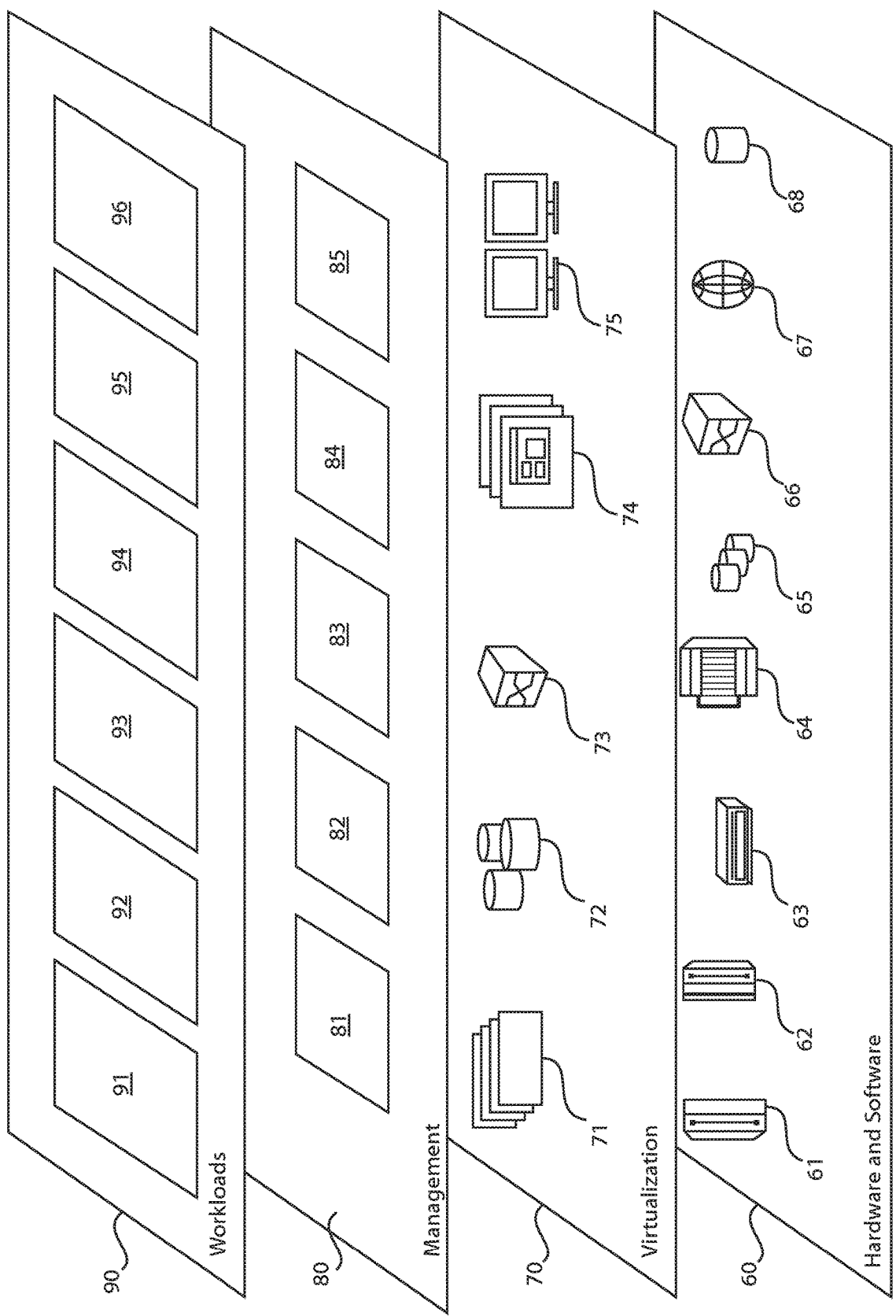
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for securely displaying midair projections, which is described with reference to FIGS. 1A-6.

Having described preferred embodiments of a method, system and computer program product for content security for midair projections, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A security method comprising:
   determining a sensitivity value for the content to be projected onto a holographic surface, the sensitivity value being related to sensitivity of the content;
   determining an identity for people within visual range of the holographic surface;
   determining by computer implemented method which of the people are authorized to view the content being projected onto the holographic surface according to the sensitivity level;

shaping the holographic surface to provide a reshaped holographic surface that obstructs people that are not authorized to view the sensitivity level of the content; and projecting the content onto the reshaped holographic surface using a projector within vision of people authorized to view the sensitivity level of the content, wherein shaping the holographic surface to provide the reshaped holographic surface comprises increasing a thickness of the holographic surface to not be transparent to the people that are not authorized to view the sensitivity level of the content.

2. The method of claim 1, wherein the sensitivity value for the content is assigned by a plurality of factors related to the sensitivity of the content.

3. The method of claim 2, wherein one or more of the factors are selected from a group consisting of image analysis, text analysis, tags, active learning, an indication supplied by an author of the content, an indication supplied by a party that viewed the content prior to said determining the sensitivity value, and a combination thereof.

4. The method of claim 3, wherein the holographic surface is displayed from a projector that is pivotably mounted to a surface of a room containing said people.

5. The method of claim 4, determining identity for the people that are within visual range of the holographic surface comprises facial recognition of the people within the room using cameras, GPS tracking of people within the room, the people signing into the room, or a combinations thereof.

6. The method of claim 5, further comprising tracking the people within the room using camera tracking or GPS tracking to determine the location of the people for positioning the holographic surface.

7. The method of claim 1, wherein shaping the holographic surface to provide the reshaped holographic surface comprises producing a curvature to the holographic surface to partially enclose the people authorized to view the sensitivity level of the content.

8. The method of claim 1, wherein the content is selected from the group consisting of an image, video, icons for applications, and a combination thereof.

9. A system comprising:
a memory;
a hardware processor coupled to the memory;
a sensitivity assignment application including instructions on said memory executed by the hardware processor for determining a sensitivity value for the content to be projected onto a holographic surface;
  a content to people calculator for determining which of the people that are within visual range of the holographic surface is authorized to view the content being projected onto the holographic surface according to the sensitivity level;
  an image shaping device for shaping the holographic surface to provide a reshaped holographic surface that obstructs people that are not authorized to view the sensitivity level of the content; and
  at least one projector for producing the reshaped holographic surface that obstructs people that are not authorized to view the sensitivity level of the content, and for projecting the content onto the reshaped holographic surface within vision of people authorized to view the sensitivity level of the content, wherein said producing the reshaped holographic surface comprises increasing a thickness of the holographic surface to not be transparent to the people that are not authorized to view the sensitivity level of the content.

10. The system of claim 9, wherein the sensitivity value for the content is assigned by image analysis, text analysis, tags, active learning, an indication supplied by an author of the content, an indication supplied by a party that viewed the content prior to said determining the sensitivity value, and a combination thereof.

11. The system of claim 10, wherein the holographic surface is displayed in midair.

12. The system of claim 11, wherein said at least one projector is pivotably mounted to a surface of a room containing said people.

13. The system of claim 11, further including a people identifier for determining identity for the people that are within visual range of the holographic surface.

14. The system of claim 13, wherein the people identifier comprises facial recognition of the people within the room using cameras, GPS tracking of people within the room, the people signing into the room, or a combinations thereof.

15. The system of claim 14, further comprising tracking the people within the room using camera tracking or GPS tracking to determine the location of the people for positioning the holographic surface.

16. The system of claim 9, wherein shaping the holographic surface to provide the reshaped holographic surface comprises producing a curvature to the holographic surface to partially enclose the people authorized to view the sensitivity level of the content.

17. The system of claim 9, wherein the content is selected from the group consisting of an image, video, icons for applications, and a combination thereof.

18. A computer program product for performing a security method comprising a computer readable storage medium having computer readable program code embodied therein, the computer readable program code executable by a processor to cause the processor to:
  determine, using the processor, a sensitivity value for the content to be projected onto a holographic surface;
  determine, using the processor, identity for people that are within visual range of the holographic surface;
  determine, using the processor, which of the people is authorized to view the content being projected onto the holographic surface according to the sensitivity level;
  shape, using the processor, the holographic surface to provide a reshaped holographic surface that obstructs people that are not authorized to view the sensitivity level of the content; and
  project, using the processor, the content onto the reshaped holographic surface within vision of people authorized to view the sensitivity level of the content, wherein shaping the holographic surface to provide the reshaped holographic surface comprises increasing a thickness of the holographic surface to not be transparent to the people that are not authorized to view the sensitivity level of the content.

\* \* \* \* \*